United States Patent [19]

Klopfer

[11] 3,923,892

[45] Dec. 2, 1975

[54] AROMATIC AMINE ALKYLATION

[75] Inventor: Osakar E. H. Klopfer, Lamar, Ark.

[73] Assignee: Ethyl Corporation, Richmond, Va.

[22] Filed: Mar. 25, 1974

[21] Appl. No.: 454,134

Related U.S. Application Data

[60] Continuation-in-part of Ser. No. 102,075, Dec. 28, 1970, abandoned, which is a division of Ser. No. 782,706, Dec. 10, 1968, Pat. No. 3,654,331.

[52] U.S. Cl. ............... 260/578; 260/568; 260/576; 260/577
[51] Int. Cl.² ........................................ C07C 85/00
[58] Field of Search ..................................... 260/578

[56] References Cited
UNITED STATES PATENTS
3,275,690   9/1966   Stroh et al. .................... 260/578 X
3,649,693   3/1972   Napolitano ...................... 260/578

*Primary Examiner*—Paul F. Shaver
*Attorney, Agent, or Firm*—Donald L. Johnson; Robert A. Linn; Joseph D. Odenweller

[57] ABSTRACT

Aromatic amines having a hydrogen atom on at least one nuclear carbon atom ortho to an amine group (e.g., aniline) are selectively orthoalkylated by adding a catalytic amount of an alkyl aluminum halide such as diethyl aluminum chloride to the aromatic amine and then heating the resultant mixture to about 100°–500°C in the presence of an olefin. The process may also be carried out in the added presence of an aluminum anilide.

13 Claims, No Drawings

AROMATIC AMINE ALKYLATION

This application is a continuation-in-part of application Ser. No. 102,075, filed Dec. 28, 1970, now abandoned, which in turn is a division of application Ser. No. 782,706, filed Dec. 10, 1968, now U.S. Pat. No. 3,654,331.

BACKGROUND

Aromatic amines are useful in a broad range of applications. For example, they are antiknock agents in gasoline used in spark ignited internal combustion engines. They are also valuable intermediates in the dye industry. They are also beneficial when added to rubber, wherein they prevent degradation caused by ozone. Another use in particular for anilines substituted in an ortho position with an ethyl radical is in the preparation of indole and indole derivatives. For example, ortho-ethyl aniline is converted to indole by contact with a titanium dioxide catalyst at a temperature of around 600°C (U.S. Pat. No. 2,886,573).

Prior to the work of Kolka et al. (U.S. Pat. No. 2,814,646), no commercially practical method was known for the orthoalkylation of aromatic amines. Kolka et al. found that they could obtain good yields of orthoalkylated aromatic amines by reacting an olefin with an aromatic amine in the presence of an aluminum anilide.

SUMMARY

The present invention relates to an improvement in the process of orthoalkylating an aromatic amine having at least one hydrogen atom bonded to a nuclear carbon atom ortho to an amino group. In particular, this invention relates to a highly selective aniline orthoalkylation process which proceeds at a high rate. Accordingly, an object of this invention is to provide an improved orthoalkylation process applicable to aromatic amines resulting in faster alkylation rate than heretofore attainable under similar reaction conditions. This and other objects are accomplished by providing an improved process for the selective nuclear alkylation of an aromatic amine having at least one hydrogen atom bonded to a nuclear carbon atom ortho to an amino group and having at least one hydrogen atom bonded to an amino nitrogen atom, said process comprising adding a catalytic amount of an alkyl aluminum halide to said aromatic amine and heating the mixture with an olefin to a temperature of from about 100°–500°C.

DESCRIPTION OF THE PREFERRED EMBODIMENTS

A preferred embodiment of this invention is an improvement in a process for alkylating an aromatic amine selectively in a nuclear position ortho to an amine group by reacting the aromatic amine with an olefin hydrocarbon at a temperature of about 100°–500°C, more preferably 200°–400°C, in the presence of an aluminum anilide catalyst. According to the improved process the aluminum anilide catalyst is formed by adding an alkyl aluminum halide to the aromatic amine. The improved process exhibits an alkylation rate over twice as fast as that obtained under the same conditions but using a non-halogen aluminum anilide catalyst such as is formed by reacting an aromatic amine with aluminum metal or aluminum alkyls.

The particular aromatic amine used in the improved process is not critical as long as it has at least one hydrogen atom bonded to the amine group and at least one position on the benzene ring ortho to the amine group which is unsubstituted except for hydrogen. Such aromatic amines are well known in the art. They have been used in previous alkylation procedures such as those described by Kolka et al., U.S. Pat. No. 2,814,646, and Stroh et al., U.S. Pat. No. 2,762,845 and U.S. Pat. No. 3,275,690.

The aromatic amines that can be used in the process can be mono- or poly- nuclear and also mono- or poly- amino as, for example, amino benzenes, amino naphthalenes, amino anthracenes, amino phenanthrenes, amino chrysenes, amino pyrenes, and the like. In other words, the aromatic amine may be mononuclear such as aniline or fused-ring polynuclear such as β-naphthyl amine. Likewise, it can be a heterocyclic aromatic amine in which an amine group is bonded to a carbocyclic benzene ring which is fused to a heterocyclic ring, for example, 5-aminoindole. The aromatic amines can also have other nuclear substituents such as alkyl, aryl, alkaryl, aralkyl, cycloalkyl, substituted-cycloalkyl, halogen, alkoxy, aryloxy, and the like. Likewise, the nuclear substituents may form a closed ring such as in the case of indene. Of the various aromatic amines, the preferred are the mono-, di- or tri-nuclear amines. In particular, the amino benzenes are most useful.

Examples of suitable amines include m-toluidine, o-toluidine, 4-isobutylaniline, 4-sec-eicosylaniline, N-methylaniline, 2-tert-butylaniline, 4-phenylaniline, 4-α-methylbenzylaniline, 4,4'-methylenebisaniline, 4,4'-isopropylidenebisaniline, p-phenylenediamine, N,N'-dimethyl-p-phenylenediamine, 6-sec-eicosyl-α-naphthylamine, α-naphthylamine, β-naphthylamine, N-methyl-α-naphthylamine, α-aminoanthracene, 3-aminophenanthrene, 7-aminoindene, 1-aminochrysene, 2-aminopyrene, 4-cyclohexylaniline, 4-phenylaniline, 6-aminoisoindene, 6-aminobenzofuran, 4-aminoisobenzofuran, 7-aminothianaphthene, 5-aminoindole, 6-amino-4-methyl-isoindole, and 5-amino-1,3-benzoisodiazole.

The more preferred amines are the primary and secondary amino benzenes, referred to collectively as anilines. Examples of these are aniline, o-toluidine, N-methylaniline, N-ethylaniline, p-sec-docosylaniline, p-methoxyaniline, p-bromoaniline, N-butyl-m-bromoaniline, and 4-chloroaniline.

Of these, the most preferred is aniline itself or alkyl-substituted anilines wherein the alkyl substituent contains from 1 to about 12 carbon atoms. Examples of these are aniline, o-toluidine, p-toluidine, o-ethylaniline, p-ethylaniline, p-tert-butylaniline, 4-sec-dodecylaniline, and the like.

The alkyl aluminium halides added to the aromatic amines prior to reaction with olefins include any aluminium compound containing both an alkyl radical in which a carbon atom of the alkyl is bonded directly to an aluminum atom and also containing a halogen atom bonded directly to the aluminum atom. These include the dialkyl aluminum halides, the alkyl aluminum dihalides, and the alkyl aluminum sesquihalides. Some examples of suitable dialkyl aluminum halides are dimethyl aluminum bromide, diethyl aluminum bromide, diethyl aluminum chloride, di-n-propyl aluminum chloride, diisobutyl aluminum iodide, diisoamyl aluminum chloride, di-n-dodecyl aluminum chloride, dieicosyl aluminum bromide. Examples of useful alkyl aluminum dihalides include methyl aluminum dichloride, ethyl aluminum dichloride, ethyl aluminum dibromide, n-propyl aluminum dichloride, isobutyl aluminum dibromide, n-hexyl aluminum dibromide, sec-decyl aluminum di-iodide, n-dodecyl aluminum dichloride, and n-eicosyl aluminum dibromide.

Both the above dialkyl aluminum halides and the alkyl aluminum dihalides are believed to exist in the form of dimers and these, of course, are included within the invention.

Alkyl aluminum sesquihalides have the empirical formula:

$$R_3 Al_2 X_3$$

in which R represents an alkyl group and X a halogen atom. Examples of useful alkyl aluminum sesquihalides include methyl aluminum sesquichloride, methyl aluminum sesquibromide, ethyl aluminum sesquichloride, ethyl aluminum sesquibromide, ethyl aluminum sesquiiodide, n-propyl aluminum sesquichloride, n-propyl aluminum sesquibromide, isobutyl aluminum sesquichloride, isobutyl aluminum sesqui-iodide, n-hexyl aluminum sesqui-iodide n-decyl aluminum sesquichloride, n-dodecyl aluminum sesquibromide, and sec-eicosyl aluminum sesquichloride.

The above alkyl aluminum halides can be used individually or can be added to the aromatic amine as mixtures with good results. Frequently, due to their tendency to ignite on exposure to air, they are used in the form of solutions in inert solvents such as hydrocarbons or ethers. Particularly useful solvents are the hydrocarbons such as hexane, heptane, isooctane, benzene, toluene, xylene, and the like.

Although the preferred catalysts are the alkyl aluminum halides, the process can also be carried out using aryl aluminum halides and, hence, these are considered equivalents. The alkyl aluminum halides are more readily available and are, accordingly, preferred.

The amount of alkyl aluminum halide added should be a catalytic amount. This means it should be sufficient to cause the olefin to alkylate the aromatic amine at a satisfactory rate under the reaction conditions employed. At higher temperatures and/or higher olefin concentrations, less catalyst is required. In general, good results are obtained if sufficient alkyl aluminum halide is added to the aromatic amine to provide one gram atom of aluminum for each 5–40 gram moles of aromatic amine, although more or less can be used. A more preferred operating range is the amount sufficient to provide one gram atom of aluminum for each 7–25 gram moles of aromatic amine, and a most preferred amount is that which provides one gram atom of aluminum per each 10–20 gram moles of aromatic amine.

The olefin hydrocarbons useful in the process are not critical and include olefins which are both mono- or poly-unsaturated, cyclic or acyclic, substituted or unsubstituted, and both terminal and internal olefins. They include all the olefins used in the acknowledged prior art processes.

Examples of acyclic monoolefins are ethylene, proplylene, butene-1, butene-2, isobutene, pentene-1, isopentene, pentene-2, hexene-1, hexene-2, 2-methyl pentene-1, 2-methyl pentene-2, n-decene-1, 2-ethyl octene-1, 2-ethyl octene-2, n-decene-2, dodecene-1, 2-ethyl decene-1, 2-ethyl decene-2, dodecene-2, octadecene-1, octadecene-2, 2-methyl heptadecene-1, diisobutylene, eicosene-1, eicosene-2, 2-ethyl octadecene-1, docosene-1, docosene-2, triacontene-1, 2-ethyl octacosene-1, tetracontene-2, pentacontene-1, and the like.

Examples of cyclic monoolefins are cyclopentene, cyclohexene, cyclooctene, 1-methylcyclohexene, 1-butylcyclohexene, 1-methylcyclooctene, and the like.

Useful acyclic polyenes include 1,3-butadiene, 2-methyl-1,3-butadiene, 2,3-dimethyl-1,3-butadiene, 1,4-pentadiene, and the like.

Some useful cyclic polyenes are cyclopentadiene, dicyclopentadiene, 1,3-cyclooctadiene, 1,3-cyclopentadiene, 1,4-octadiene, 1,3,5-cyclooctatriene, and the like.

Non-hydrocarbon olefins can be used, although these olefins are not preferred. They can have any substituents that do not interfere with the reaction. Examples of such substituents are halogens, alkoxy groups, aryloxy groups, aryl radicals, and the like. Illustrative examples of such non-hydrocarbon olefins are 2-chloro-1,3-butadiene, vinyl chloride, allyl chloride, vinyl bromide, ethyl vinyl ether, phenyl vinyl ether, butyl vinyl ether, lauryl acrylate, methyl acrylate, and the like.

In general, the most preferred olefin reactants are the hydrocarbon acyclic monoolefins containing from 2–50 carbon atoms, cyclic olefins containing from 5–10 carbon atoms, and aryl-substituted monoolefins containing from 8–20 carbon atoms.

The amount of olefin added to the aromatic amine will vary depending upon whether mono- or di- alkylation is desired. The precise amount is not a critical feature of the process. In general, from about 0.5 mole equivalent to 8 mole equivalents of olefin are added for each mole of aromatic amine. A most useful range is from about one mole equivalent to 3 mole equivalents of olefin for each mole equivalent of aromatic amine.

The process proceeds best at elevated temperatures. A useful range is from about 100°–500°C. A preferred temperature range is from about 200°–400°C, and best results are usually obtained at about 300°–350°C.

The pressure under which the reaction is conducted is not an independent variable, and varies with the temperature and vapor pressure of the reactants. With the more volatile lower olefins such as ethylene, the reaction pressure will be quite high, while with the higher olefins only moderate pressures will be observed. Depending upon the reactants and the temperature, the pressure will range from about atmospheric to 2500 psig.

The process should be conducted under a substantially inert atmosphere. Excessive amounts of oxygen or moisture will stop the alkylation. This is not to say that the reactants need be absolutely anhydrous, but only that they should be substantially anhydrous. Also, the amount of oxygen in the reaction vessel should be minimized, generally by flushing the reaction vessel with an inert gas such as nitrogen, methane, ethane of propane, prior to conducting the reaction.

The reaction can be conducted in the presence of an inert solvent. suitable solvents include aromatic and aliphatic hydrocarbons. Examples of useful aromatic hydrocarbons are toluene, xylene, mesitylene, and the like. Examples of useful aliphatic hydrocarbons are hexane, n-octane, isooctane, decane, and the like.

It is generally preferred to first add the alkyl aluminum halide to the aromatic amine, heat the mixture, and then add the olefin over a period of time as the reaction proceeds. Variations of this sequence are possible which will accomplish similar results. For example, the olefin can be added to the aromatic amine followed by the addition of the alkyl aluminum halide. Likewise, the alkyl aluminum halide can be dissolved in the olefin and this solution added to the aromatic amine. These variations are all considered equivalents of the preferred method.

The reaction time will vary to some extent with the reactants used. A greater influence is exerted by the reaction temperature and the amount of alkyl aluminum halide added. The process should be conducted until the desired degree of orthoalkylation is attained. The progress of the reaction is readily monitored by periodically withdrawing samples and analyzing them by vapor phase chromatograph.

The product is readily recovered by well-known methods. Actually the conversions are generally high enough to permit use of the product without a special recovery step other than an aqueous wash to remove the catalyst. When a purer product is desired, this is obtained by distilling the final reaction mixture. It is generally preferred, though not required, to add sufficient water to the mixture to neutralize the catalyst prior to distillation.

When the alkyl aluminum halide is added to the aromatic amine and the mixture heated, a reaction occurs between the aromatic amine and the alkyl aluminum halide whereby the alkyl groups are replaced by the aromatic amines, forming "anilino aluminum halide type" catalysts. In the above context, the term "anilino" is understood not to be restricted to aniline radicals only, but to any of the radicals derived from the forementioned aromatic amines by removal of a hydrogen atom bonded to the amine nitrogen. The amine nitrogen thereby forms a bond directly to the aluminum atom. These new compounds can be represented by the following formula:

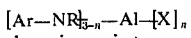

wherein $n$ is an integer selected from 1 and 2, Ar represents the aryl portion of the aryl amines having at least one nuclear ortho position substituted with hydrogen, as previously described, and R is hydrogen or an alkyl or aryl group. Alkyl groups which may be present include methyl, ethyl, propyl, butyl, isobutyl, octyl, dodecyl, eicosyl, and the like. Suitable aryl radicals are phenyl, p-tolyl, p-dodecylphenyl, p-chlorophenyl, p-tert-butylphenyl, p-sec-tetradecylphenyl, α-naphthyl, β-naphthyl, β-chloro-α-naphthyl, and the like. X in the above formula represents halogens having an atomic number from 17 through 53, such as chlorine, bromine and iodine. are:

di(N-methylanilino) aluminum chloride
di(p-tert-butylanilino) aluminum bromide
di(p-chloroanilino) aluminum iodide
di(4-bromoanilino) aluminum bromide
di(4-sec-eicosylanilino) aluminum chloride
2-methyl-4-tert-butylanilino aluminum dichloride
N-eicosylanilino aluminum dibromide
di(N-n-butyl-4-tert-octylanilino) aluminum iodide
di(N-n-dodecyl-4-sec-tetradecylanilino) aluminum chloride
N-phenyl-4-tert-butylanilino aluminum bromide
α-naphthylamino aluminum dichloride
β-naphthylamino aluminum dibromide
α-anthraceneamino aluminum dichloride
3-phenanthreneamino aluminum diiodide
1-chryseneamino aluminum dibromide
N-(4-methylphenyl)-4-sec-tetradecylanilino aluminum dichloride
di(α-naphthylamino) aluminum chloride In a preferred embodiment the aryl portion represented by Ar in the above formula is a mononuclear aryl group unsubstituted in at least one ortho position except by hydrogen and containing from about 6–20 carbon atoms, and $R_1$ is hydrogen. Examples of this embodiment are:

dianilino aluminum chloride
dianilino aluminum bromide
dianilino aluminum iodide
anilino aluminum dichloride
anilino aluminum dibromide
anilino aluminum diiodide
2-methyl anilino aluminum diiodide
di(4-tert-butylanilino) aluminum bromide
di(4-tert-tetradecylanilino) aluminum chloride
di(4-sec-octadecyl anilino) aluminum bromide
di(4-chloroanilino) aluminum chloride
3-bromoanilino aluminum dibromide
2-methyl-5-methoxyanilino aluminum diiodide
4-butoxyanilino aluminum dibromide When the alkyl aluminum halide is added to aniline itself, which is a preferred embodiment of this process, anilino aluminum halides will form. For example, when diethyl aluminum chloride is added to aniline and the mixture heated in preparation for conducting the orthoalkylation process, a reaction occurs forming dianilino aluminum chloride. Likewise, when ethyl aluminum dichloride is added to aniline and the mixture heated, anilino aluminum dichloride forms. Similarly, the addition of ethyl aluminum sesquichloride or methyl aluminum sesquichloride to aniline leads to the formation of a mixture of dianilino aluminum chloride and anilino aluminum dichloride.

From the foregoing discussion, it is apparent that the process of this invention might be defined as the process of reacting an aromatic amine having at least one hydrogen atom bonded to a nuclear carbon atom ortho to an amino group and having at least one hydrogen atom bonded to an amino nitrogen atom with an olefin in the presence of an anilino aluminum halide type catalyst at a temperature of from about 100°–500°C. The aromatic amine and olefin would, of course, be the same as previously described. However, it is preferred that this process be defined by the steps of adding the alkyl aluminum halide to the aromatic amine followed by reaction with an olefin, no matter what the exact mechanism might be, as this represents the most facile method of conducting the process and leads to high conversions of orthoalkylated aromatic amines in short reaction times with little by-product formation.

As previously mentioned, it is known from Kolka et al. that aromatic amines can be orthoalkylated by reaction with an olefin in the presence of an aluminum anilide. The aluminum anilide can be formed from aluminum metal or from aluminum alkyls, e.g., triethyl aluminum. Although that process is quite effective in orthoalkylating aromatic amines, the present process offers an advantage in giving much higher reaction rates and requiring less catalyst under similar reaction conditions. The catlyst used in the Kolka et al. process can be derived from metallic aluminum, which is less expensive than the alkyl aluminum halides used in this invention. However, it is possible to retain some of the economies of the Kolka et al. process and yet obtain much of the advantage of the present process by using a composite catalyst in which the process is conducted in the presence of an aluminum anilide type catalyst as described by Kolka et al., but also a small amount of alkyl aluminum halide is added to give the higher reaction rates of this invention. The result is that the process then comprises the reaction of an aromatic amine with an olefin both as previously described in the presence of an "anilino aluminum halide type" catalyst and an aluminum anilide which does not contain a halogen bonded to aluminum.

When this composite embodiment of this invention is used the total amount of the catalyst in the system, based upon the ratio of aluminum to aromatic amine, remains the same as previously described. However, higher alkylation rates are obtained when the same amount of catalyst based upon aluminum is used. Part of the catalyst is supplied as aluminum anilide, most readily formed by merely adding metallic aluminum to the reaction mass as described by Kolka et al., and the remainder of the catalyst is supplied by adding an alkyl aluminum halide to the aromatic amine. Generally, at least 10 percent of the total aluminum present in the system should be derived from an alkyl aluminum halide in order to obtain the accelerated reaction rate.

As previously stated, the present improvement results in a greatly increased alkylation rate compared to that obtained under the same reaction conditions but using the previously known non-halogen aluminum anilide catalyst. The improvement generally results in more than doubling the alkylation rate. This effect is shown by the following two examples which compare the results obtained using triethyl aluminum to those obtained using diethyl aluminum chloride.

EXAMPLE 1

This example shows the results obtained when triethyl aluminum is used in the process.

In a one liter autoclave was placed 326 grams (3.5 moles) of aniline and 26.7 grams (0.234 mole) of triethyl aluminum under a nitrogen atmosphere. This results in an aniline:aluminum mole ratio of 15:1. The autoclave was sealed and the contents stirred and heated to 120°C, during which time pressure rose to 180 psig. The autoclave was then cooled to 40°C and residual pressure vented. Then, 49 grams of ethylene was forced into the autoclave. Heat was applied such that in 27 minutes the temperature rose to 300°C, at which time pressure was 900 psig. This point is considered the start of the alkylation process. The reaction was continued at 300°C while ethylene was continuously fed to maintain a pressure of about 1000 psig (range 960–1035 psig). Samples were periodically withdrawn and analyzed by gas chromatography to monitor the course of the reaction. A total of 215 grams of ethylene was added. The ethylene addition took 455 minutes from the start of the alkylation.

The following table shows the course of the alkylation reaction using triethyl aluminum based upon the analysis of the withdrawn samples.

|  | Time from start (min.) | | | | |
| --- | --- | --- | --- | --- | --- |
|  | 0 | 77 | 207 | 356 | 470 |
| aniline | 95.6 | 70.2 | 37.7 | 16.5 | 7.2 |
| 2-ethyl aniline | 2.7 | 25.3 | 43.2 | 38.6 | 26.2 |
| 2,6-di-ethyl aniline | 2.1 | 3.6 | 19.7 | 43.1 | 63.5 |
| 2-sec-butyl-6-ethyl aniline | — | — | 0.3 | 1.0 | 2.0 |
| isomer of " | — | — | — | — | — |
| diphenylamine | — | 0.2 | 0.4 | 0.4 | 0.5 |
| ethyl diphenylamine | — | — | 0.2 | 0.2 | 0.3 |

EXAMPLE 2

This example shows the results obtained when the above example is repeated using an alkyl aluminum halide in place of aluminum alkyl.

In a one liter autoclave was placed 326 grams (3.5 moles) of aniline and 28.2 grams (0.234 mole) of diethyl aluminum chloride under a nitrogen atmosphere. This results in an aniline:aluminum mole ratio of 15:1. The autoclave was sealed and the contents stirred and heated to 121°C, during which time pressure rose to 100 psig. The autoclave was then cooled to 65°C and residual pressure vented. Then, 49 grams of ethylene was forced into the autoclave. Heat was then applied such that in 28 minutes the temperature was 306°C, at which time pressure was 920 psig. This point is considered the start of the alkylation process. The reaction was continued at about 300°C while ethylene was continuously fed to maintain a pressure of about 1000 psig (range 940–1000 psig). Samples were periodically withdrawn and analyzed by gas chromatography to monitor the course of the reaction. A total of 219 grams of ethylene was added. The ethylene addition took 150 minutes from the start of the alkylation.

The following table shows the course of the alkylation reaction using diethyl aluminum chloride based upon analysis of the withdrawn samples.

|  | Time from start (min.) | | | | |
| --- | --- | --- | --- | --- | --- |
|  | 0 | 45 | 92 | 137 | 167 |
| aniline | 93.4 | 53.3 | 23.3 | 6.7 | 1.6 |
| 2-ethyl aniline | 8.0 | 36.9 | 40.8 | 25.7 | 9.0 |
| 2,6-di-ethyl aniline | 1.2 | 10.3 | 30.3 | 63.2 | 87.8 |
| 2-sec-butyl-6-ethyl aniline | — | — | 0.4 | 0.5 | 1.0 |
| isomer of " | — | — | 0.3 | 0.3 | 0.7 |
| diphenylamine | 0.3 | 1.2 | 1.0 | 0.7 | 0.8 |
| ethyl diphenylamine | 0.2 | 0.4 | 0.4 | 0.3 | 0.7 |

As the above two examples show, the reaction rate obtained with the alkyl aluminum halide was about four times as fast as that obtained with an aluminum alkyl. Extrapolation of the results of Example 1 indicate that it would take about 607 minutes for the alkylation using triethyl aluminum to reach the 87.8 per cent 2,6-di-tert-aniline composition achieved with diethyl aluminum chloride in only 167 minutes. Similar improved results are obtained under any specified set of reaction conditions.

The following examples will serve to further illustrate the manner in which the present invention is conducted and demonstrate the higher reaction rates made possible compared to the prior art methods. All parts are parts by weight unless otherwise stated.

EXAMPLE 3

Orthoalkylation of Aniline Using an Aluminum Anilide Catalyst

The following example was conducted following the general procedure of Kolka et al. using aluminum metal to form the catalyst.

In a pressure reaction vessel equipped with stirrer, thermometer, heating means and means for adding ethylene under pressure, was placed 326.9 parts of aniline and 12.6 parts of granular aluminum. This gave an aniline to aluminum mole ratio of 7.5. The vessel was flushed with nitrogen and sealed. While stirring, it was heated to 202°C, at which temperature an exothermic reaction occurred causing the temperature to rise about 40° and the pressure to increase from 20 psig to 505 psig. The reaction mixture was stirred 10 minutes and then cooled to 94°C. The hydrogen formed by reaction of the aluminum with aniline was vented and the vessel again sealed and pressurized to 300 psig eith ethylene. It was then heated to 320°C and pressurized to 900 psig with ethylene. The vessel was then heated to 350°C, and maintained at about this temperature and at 750–950 psig by repressurizing the reaction vessel to 950 psig with ethylene each time the pressure dropped to 750 psig. After 3 hours and 15 minutes the reaction stopped. The reaction mixture was cooled and discharged, giving 515 parts of product containing 87.5 weight per cent 2,6-diethyl aniline.

EXAMPLE 4

Orthoalkylation of Aniline Using Diethyl Aluminum Chloride

The following example shows the faster reaction rate obtained even at lower temperatures using diethyl aluminum chlorides as the catalyst.

To the reaction vessel described in Example 3 was added 326.9 parts of aniline and 55.3 parts of diethyl aluminum chloride under a nitrogen atmosphere. This gave the same 7.5 aluminum to aniline mole ratio as in Example 3. The vessel was sealed and, while stirring, heated to 150°C. It was then vented, following which it was pressurized to 300 psig with ethylene. It was heated to 300°C and then pressurized to 950 psig with ethylene. The temperature was maintained at about 300°C and the ethylene pressure between 750 and 950 psig, as in Example 3. After one hour and 55 minutes the reaction stopped and the vessel was cooled and discharged, giving 525 parts of product analyzing 90.7 weight per cent 2,6-diethylaniline. Thus, the use of the alkyl aluminum halide gave a higher ortho-alkyl aniline conversion than the straight aluminum anilide catalyst. This higher conversion was obtained in less than 2 hours, whereas the aluminum anilide catalyst required 3 hours and 15 minutes. Furthermore, the higher conversion was accomplished at a substantially lower temperature.

EXAMPLE 5

The following example shows the results obtained following the general procedure of Example 4 but using only half as much diethyl aluminum chloride. In this example 326.9 parts of aniline and 27.65 parts of diethyl aluminum chloride were placed in the reaction vessel and the mixture heated to 150°C, as in Example 4. The rest of the procedure was carried out the same as Example 4 except the reaction temperature was about 320°C. A period of 2 hours and 56 minutes was required to complete the alkylation, which resulted in 521 parts of product analyzing 93 weight per cent 2,6-diethylaniline. Thus, the use of the alkyl aluminum chloride gives a higher conversion at lower temperature and shorter reaction time than the straight aluminum anilide process and accomplishes this with only half the amount of aluminum present in the reaction mixture.

EXAMPLE 6

The following example shows the results obtained with a composite catalyst formed by adding both aluminum metal and an alkyl aluminum chloride to the reaction mixture.

In the reaction vessel of Example 3 was placed 326.9 parts of aniline, 19.62 parts of ethyl aluminum sesquichloride and 2.1 parts of granular aluminum. This gave an aniline to aluminum mole ratio of 15. The vessel was sealed and heated to 300°C, at which point the pressure was 365 psig. It was then cooled and vented, following which it was pressurized to 300 psig with ethylene and then heated to 320°C. The alkylation was carried out using ethylene at a pressure of 750–950 psig as in the previous examples. A reaction time of 2 hours and 52 minutes was required and the process yielded 523 parts of product analyzing 93.0 per cent 2,6-diethylaniline. This example shows that the composite catalyst embodiment of the present invention permits the use of only one-half as much total aluminum while resulting in similar reaction rates and conversions.

EXAMPLE 7

The following example shows that the alkyl aluminum halides are effective orthoalkylation catalysts even when used in small amounts.

In the reaction vessel of Example 3 was placed 326.9 parts of aniline and 21.3 parts of diethyl aluminum chloride, all under a nitrogen atmosphere. The vessel was sealed and the mixture heated to 150°C while stirring. A pressure increase to 135 psig occurred and the vessel was vented. It was again sealed and then heated to 340°C and the ethylation conducted at 750–950 psig as in the previous examples. A reaction time of 3 hours was required, giving a high yield of 2,6-diethylaniline.

EXAMPLE 8

In the pressure reaction vessel of Example 3 was placed 700 parts of aniline and 60.4 parts of methyl aluminum sesquichloride under a nitrogen atmosphere. The mixture was heated to 295°C and then ethylene added until the pressure reached 3000 psig. At this point, the temperature had dropped to 253°C. More ethylene was added until the pressure reaches 4200 psig. The reaction was continued at about 3500–4300 psig for 4 hours. The reaction mixture was then cooled, washed with water, and the oil layer dried over anhydrous magnesium sulfate, giving a 96 percent yield of 2,6-diethylaniline.

In the following examples the same general procedure described in Examples 1–8 is followed. The reactants, reaction conditions and principal products are shown in the following table.

| Example | Aromatic Amine | Olefin | Olefin/Amine Alkyl Aluminum Mole Ratio | Catalyst[1] Halide | Alkylation Ratio | Alkylation Temp (°C) | Principal Products |
|---|---|---|---|---|---|---|---|
| 9 | aniline | styrene | 1.5 | diisobutyl aluminum bromide | 30 | 390 | O-($\alpha$-methylbenzyl)-aniline and 2,6-di-($\alpha$-methylbenzyl)aniline |
| 10 | o-toluidine | $\alpha$-methyl styrene | 1.2 | methyl aluminum sesquichloride | 10 | 100 | 2-methyl-6-($\alpha,\alpha$-dimethylbenzyl)aniline |
| 11 | $\alpha$-naphthyl amine | propylene | 1.4 | n-propyl aluminum dichloride | 7.5 | 290 | $\alpha$-isopropyl-$\alpha$-naphthyl-amine |
| 12 | p-sec-dodecyl aniline | isobutene | 5.0 | isobutyl aluminum diiodide | 5 | 400 | 2-isobutyl-4-sec-dodecyl aniline and 2,6-diisobutyl-4-sec-dodecyl aniline |
| 13 | N-methyl-p-toluidine | eicosene-1 | 3.0 | ethyl aluminum desquichloride | 7.5 | 375 | 2-sec-eicosyl-N-methyl-4-methyl aniline and 2,6-di-sec-eicosyl-N-methyl-4-methyl aniline |
| 14 | p-phenylene diamine | ethylene | 6.0 | diethyl aluminum chloride | 5 | 350 | 2,3,5,6-tetraethyl-1,4-diaminobenzene |
| 15 | 4,4'-methylene-bisaniline | isobutylene | 8.0 | ethyl aluminum sesquibromide | 7 | 290 | 4,4'-methylene bis-(2,6-diisobutyl-aniline) |

[1]Moles aromatic amine per mole of aluminum.

From the foregoing examples it is apparent that the process described herein is widely applicable to a variety of aromatic amines as previously described, and that the alkylation may be carried out using any of a wide variety of olefins. Furthermore, the process is readily carried out using any alkyl aluminum halide. As mentioned previously, the reaction may be conducted in such a manner to give monoalkylated ortho-alkyl aromatic amines as the principal product. This is easily accomplished by either using less olefin reactant or by stopping the alkylation before it has proceeded to completion. The degree of alkylation and the manner selected to achieve it will depend upon the product desired and the economics involved in obtaining it for the least cost following the process of this invention.

As stated previously, the orthoalkylated aromatic amines produced by this process are useful for many purposes such as antioxidants, antiozonants, mainly in rubber, antiknock agents for gasoline, and the like. A principal use is as a chemical intermediate. For example, ortho-ethyl aniline is readily converted to indole following the process of U.S. Pat. No. 2,886,573. The alkylated amines are also useful as intermediates for herbicides. For example, 2,6-dialkyl anilines such as 2,6-diethyl aniline may be used to prepare the plant growth regulators described in U.S. Pat. No. 3,403,994.

I claim:

1. In a process for alkylating an aromatic amine selectively in a nuclear position ortho to the amine group, said aromatic amine having at least one hydrogen atom bonded to said amine group and having at least one nuclear position ortho to said amine group unsubstituted except for hydrogen, said process comprising reacting said aromatic amine with an olefin hydrocarbon at a temperature of about 200°–400°C in the presence of an aluminum anilide catalyst, the improvement of forming said aluminum anilide catalyst by adding an alkyl aluminum halide to said aromatic amine, said improvement resulting in an alkylation rate in excess of that obtained under the same conditions using a non-halogen aluminum anilide catalyst.

2. The improved process of claim 1 wherein said aromatic amine is aniline.

3. The improved process of claim 2 wherein said olefin is ethylene.

4. The improved process of claim 3 wherein said alkyl aluminum halide is diethyl aluminum chloride.

5. The improved process of claim 2 wherein said olefin is propylene.

6. The improved process of claim 5 wherein said alkyl aluminum halide is ethyl aluminum sesquichloride.

7. The improved process of claim 1 wherein said aromatic amine is o-toluidine.

8. The improved process of claim 7 wherein said olefin is ethylene.

9. The improved process of claim 8 wherein said alkyl aluminum halide is diethyl aluminum chloride.

10. The improved process of claim 7 wherein said olefin is propylene.

11. The improved process of claim 10 wherein said alkyl aluminum halide is ethyl aluminum sesquichloride.

12. The improved process of claim 1 wherein said olefin is ethylene and said alkyl aluminum halide is diethyl aluminum chloride.

13. The improved process of claim 1 wherein said olefin is propylene and said alkyl aluminum halide is ethyl aluminum sesquichloride.

* * * * *

UNITED STATES PATENT AND TRADEMARK OFFICE
CERTIFICATE OF CORRECTION

PATENT NO. : 3,923,892
DATED : December 2, 1975
INVENTOR(S) : Oskar E. H. Klopfer It is certified that error appears in the above-identified patent and that said Letters Patent are hereby corrected as shown below:

The headings on the table appearing at columns 11 and 12 of the patent should read as follows:

| Example | Aromatic Amine | Olefin | Olefin/Amine Mole Ratio | Alkyl Aluminum Halide |
| --- | --- | --- | --- | --- |

| Catalyst[1] Ratio | Alkylation Temp (°C) | Principal Products |
| --- | --- | --- |

Signed and Sealed this fourth Day of May 1976

[SEAL]

Attest:

RUTH C. MASON
*Attesting Officer*

C. MARSHALL DANN
*Commissioner of Patents and Trademarks*